(12) United States Patent
Sarraf et al.

(10) Patent No.: US 6,747,948 B1
(45) Date of Patent: Jun. 8, 2004

(54) INTERLEAVER SCHEME IN AN OFDM SYSTEM WITH MULTIPLE-STREAM DATA SOURCES

(75) Inventors: Mohsen Sarraf, Rumson, NJ (US); Mohammed Zarrabizadeh, Woodbridge, NJ (US)

(73) Assignee: Lucent Technologies, Murray Hill, NJ (US)

( * ) Notice: Subject to any disclaimer, the term of this patent is extended or adjusted under 35 U.S.C. 154(b) by 0 days.

(21) Appl. No.: 09/371,902

(22) Filed: Aug. 11, 1999

(51) Int. Cl.[7] .......................... H04J 11/00; G06F 11/00
(52) U.S. Cl. ........................... 370/210; 714/746
(58) Field of Search .................... 370/203, 204, 370/206, 208–210, 480–482, 310, 319, 329, 344, 343; 455/10, 17, 504, 506, 63, 65; 375/260, 285; 714/100, 47, 701, 746

(56) References Cited

U.S. PATENT DOCUMENTS

| | | | | |
|---|---|---|---|---|
| 5,444,697 A | * | 8/1995 | Leung et al. | 370/207 |
| 5,535,239 A | * | 7/1996 | Padovani et al. | 370/209 |
| 5,694,389 A | * | 12/1997 | Seki et al. | 370/208 |
| 5,732,113 A | * | 3/1998 | Schmidl et al. | 375/355 |
| 5,818,813 A | * | 10/1998 | Saito et al. | 370/208 |
| 5,862,182 A | * | 1/1999 | Awater et al. | 375/279 |
| 5,914,933 A | | 6/1999 | Cimini et al. | |
| 6,005,894 A | * | 12/1999 | Kumar | 329/357 |
| 6,038,263 A | * | 3/2000 | Kotzin et al. | 370/208 |
| 6,108,353 A | * | 8/2000 | Nakamura et al. | 370/208 |
| 6,192,503 B1 | * | 2/2001 | Chennakeshu et al. | 714/796 |
| 6,317,470 B1 | * | 11/2001 | Kroeger et al. | 375/340 |

OTHER PUBLICATIONS

Hagenauer, J. et al. "The Performance of Rate–Compatible Punctured Convolutional Codes for Digital Mobile Radio," IEEE 1990.*

Bingham J. A.C. "Multicarrier Modulation for Data Transmission: An Idea Whose Time has Come," IEEE Communications Magazine, 1990.*

Weinstein S.B. et al. "Data Transmission by Frequency–Division Multiplexing Using the Discrete Fourier Transform," IEEE Transactions on Communications Technology vol. COM–19, No. 5, pp. 628–633.*

S.B. Weinstein et al., "Data Transmission by Frequency–Division Multiplexing Using the Discrete Fourier Transform," IEEE Transactions on Communication Technology, vol. COM–19, No. 5, Oct. 1971, pp. 628–634.

J. Hagenauer, et al., "The Performance of Rate–Compatible Punctured Convolutional Codes for Digital Mobile Radio," IEEE Transactions on Communications, vol. 38, No. 7, Jul. 1990, pp. 966–979.

John A.C. Bingham, "Multicarrier Modulation for Data Transmission: An Idea Whose Time Has Come," IEEE Communications Mag., May 1990, pp. 5–14.

* cited by examiner

Primary Examiner—Chi Pham
Assistant Examiner—Andrew M. Waxman

(57) ABSTRACT

A transmission system encodes blocks of source data with error correction codes and spreads encoded data for each source block over a range of time and frequencies. This has the effect of reducing the impact of flat fading. This is because if a portion of the encoded data corresponding to a block of source data is lost, as a result of flat fading during a time interval, other portions, transmitted at a different time, may not be affected. A receiving system may therefore recover the original block of source data based on the portions of the encoded data that were received, including error correction bits. The transmission and receiving systems may be orthogonal frequency division multiplexed (OFDM) communications systems.

24 Claims, 4 Drawing Sheets

| 1 | 5 | 9 | 13 | 17 | 21 | 25 | 29 | 33 | 37 | 41 | 45 |
|---|---|---|----|----|----|----|----|----|----|----|----|
| 2 | 6 | 10 | 14 | 18 | 22 | 26 | 30 | 34 | 38 | 42 | 46 |
| 3 | 7 | 11 | 15 | 19 | 23 | 27 | 31 | 35 | 39 | 43 | 47 |
| 4 | 8 | 12 | 16 | 20 | 24 | 28 | 32 | 36 | 40 | 44 | 48 |

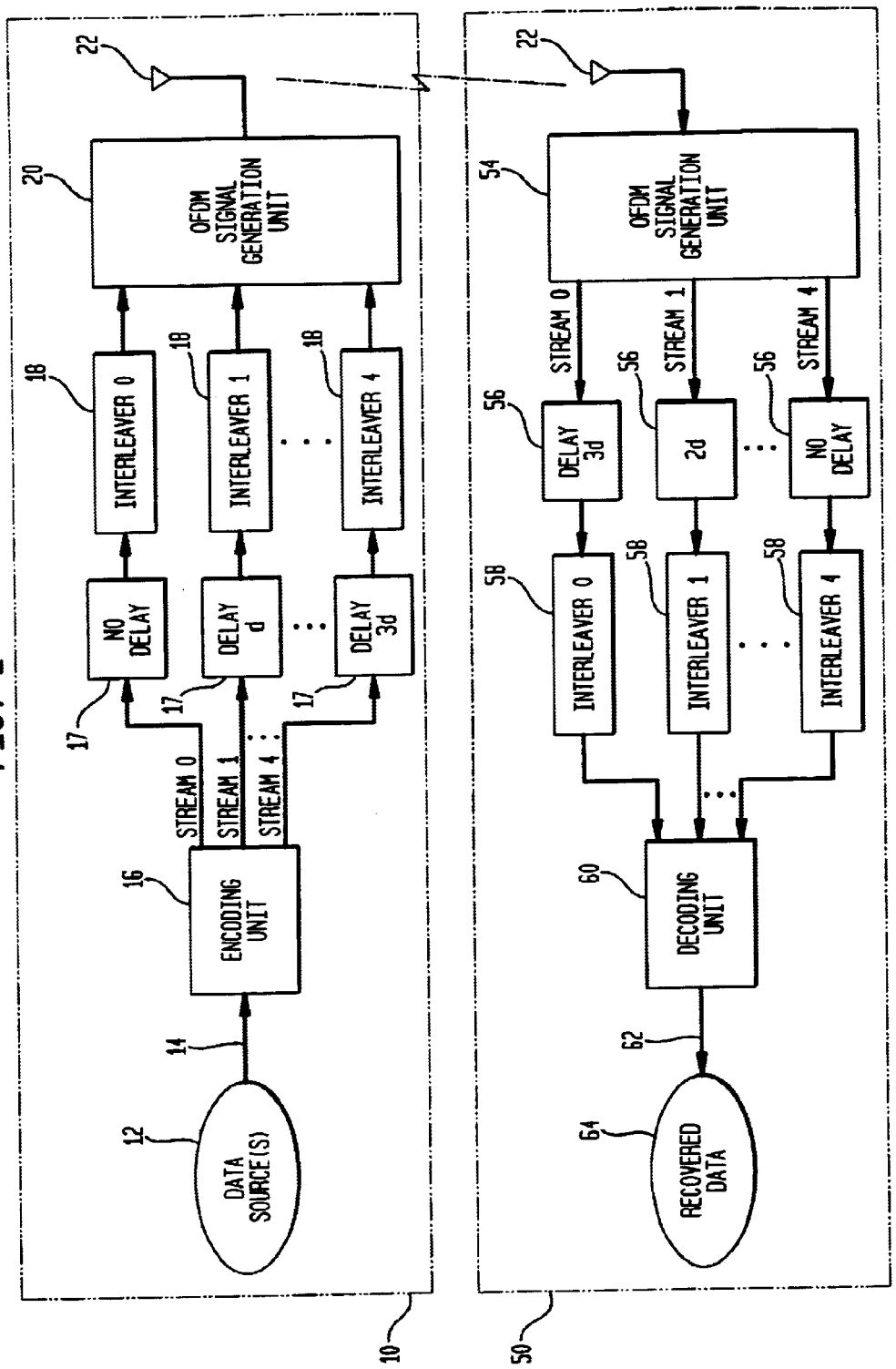

INTERLEAVER SCHEME IN AN OFDM SYSTEM WITH MULTIPLE-STREAM DATA SOURCES

FIELD OF THE INVENTION

The present invention relates to communications and, more particularly, relates to spreading data, transmitted over a communications medium over a frequency range and over time in order to reduce negative effects of channel fading and noise on the communications medium and to improve the performance of error correction decoders.

BACKGROUND OF THE INVENTION

It is a goal of communications to maximize rates of data transmission over a communications medium for a given signal to noise ratio and error rate. Typically, the bandwidth of the communications medium is limited—either inherently, based on its electromagnetic properties, or for other reasons, such as governmental regulations. Thus communications systems must make efficient use of available bandwidth. Moreover, most communications mediums are susceptible to noise. Therefore, communications systems generally must include precautions to ensure reliable data transmission despite the noise on the communications medium.

One type of noise is selective fading. Selective fading is noise or interference that affects only a portion of a frequency range. Selective fading may completely take down a communications system that relies on only a single carrier frequency for data transmission when the selective fading occurs at the single carrier frequency.

In order to combat selective fading, many communications systems incorporate multiple carrier modulation (MCM), where multiple carriers are modulated and transmitted instead of a single carrier. In multiple carrier modulation (MCM) schemes, selective fading may impair some carriers, while other carriers at different frequencies remain unimpaired. Therefore, assuming data redundancy and error correction across the multiple carriers, which is typically the case, source data from the transmission system may still be recovered by the receiving system from the unimpaired subcarriers.

Another type of fading is commonly referred to as flat fading. Flat fading is interference or noise which affects all frequencies within a bandwidth of interest nearly equally. Flat fading, when severe enough, may completely impair a MCM communications system. This is because all of the carriers may be impaired, thus preventing any data from being properly received for the duration of the flat fading.

Typically, flat fading occurs during a finite interval of time. Data transmitted during the interval of flat fading is typically lost, or severely degraded in quality. Depending on requirements, such data may need to be retransmitted, resulting in potentially substantial and unacceptable delays. Alternatively, the quality of data at the receiving end of the communications system may suffer. It the case of radio, television, or voice transmission, the degraded quality would manifest itself as audible or visible static.

It would be desirable to spread data for transmission in a communications system over time as well as frequency, so that redundant data spans over a typical flat fading interval. It would further be desirable to recover transmitted data that has been spread in time at the receiving end of a communications system. It would further be desirable to recover data at a receiver of a MCM communications system that has undergone a flat fading interval, without requiring retransmission of the data or without an unacceptable error rate.

SUMMARY OF THE INVENTION

According to the present invention, a transmission system encodes blocks of source data with error correction codes and spreads encoded data for each source block over a range of time and frequencies. This has the effect of reducing the impact of flat fading because if a portion of the encoded data corresponding to a block of source data is lost as a result of flat fading during a time interval, other portions, transmitted at a different time, may not be affected. A receiving system may therefore recover the original block of source data based on the portions of the encoded data that were received, including error correction bits.

A transmission system according to the present invention includes one or more encoders, a plurality of interleavers, at least one delay unit and a signal generation unit. The encoder receives blocks of source data from one or more data sources. The encoder derives error correction codes for each block of source data and outputs a plurality of streams of data which include the error correction codes.

The interleavers reorder each data stream into an interleaved stream. The delay units delay at least one of the data streams relative to the other data streams. When the transmission system is an orthogonal frequency division multiplexed (OFDM) transmission system, each delay unit typically inserts a delay that is an integer multiple of an OFDM frame.

The signal generation unit modulates a plurality of sub-carriers, which may be OFDM sub-carriers, based on the interleaved substreams and upconverts the modulated sub-carriers for transmission.

A receiving system according to the present invention includes a receiver, at least one delay unit, a plurality of de-interleavers and a decoder. The receiver down-converts, de-modulates and de-multiplexes a received signal into a plurality of interleaved substreams. The delay units delay at least one of the substreams relative to the other substreams. The delay for each substream is chosen to equalize a total delay added to each substream, the total delay being a sum of delay added by the transmission and receiving systems.

The interleavers reorder each stream into a plurality of serial data streams. The decoder receives the serial data streams, corrects errors present in the serial data streams and outputs decoded data.

BRIEF DESCRIPTION OF THE INVENTION

The above described features and advantages will be more fully appreciated with reference to the accompanying detailed description and figures, in which:

FIG. 2 depicts an OFDM transmission and receiving system according to the present invention.

DETAILED DESCRIPTION

Figure 1A:
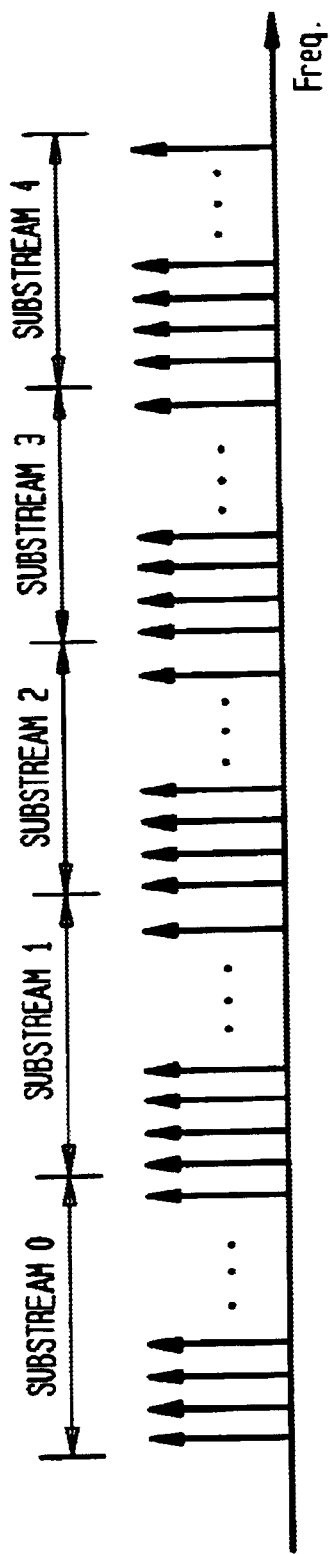
FIG. 1A depicts a frequency domain representation of a plurality of sub-carriers corresponding to five substreams in an OFDM communications system.
Figure 1B:
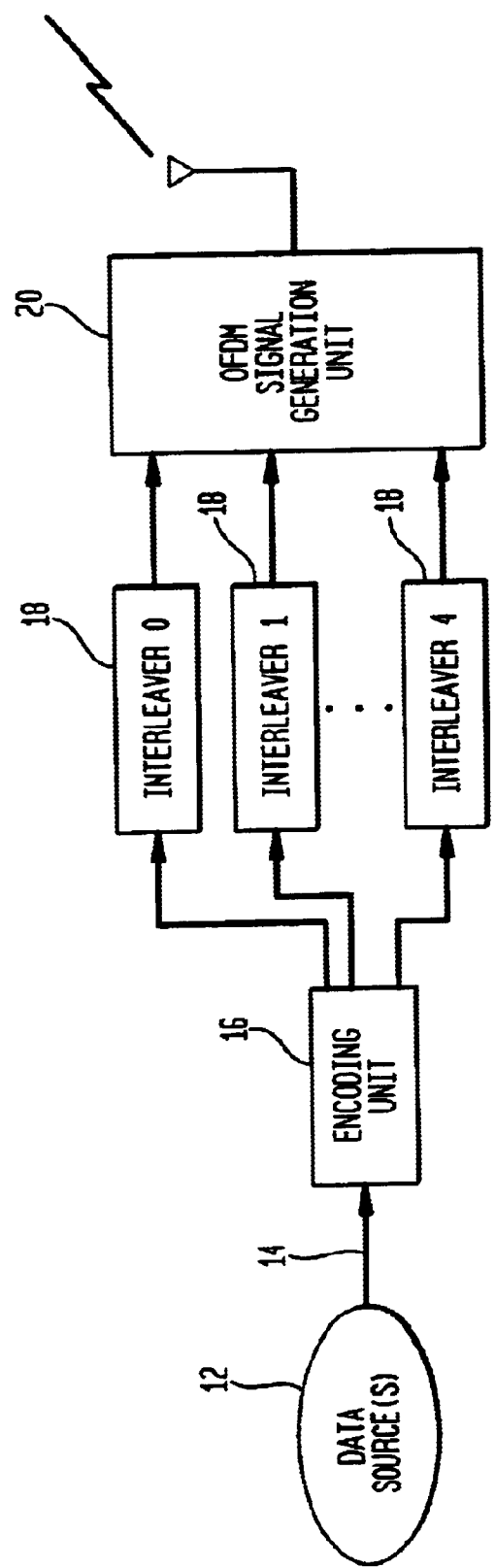
FIG. 1B depicts an OFDM transmission system.

An example of a multi-carrier modulation (MCM) system is shown in FIG. 1B, which depicts an orthogonal frequency division multiplex (OFDM) transmission system. OFDM communication systems use a plurality of sub-carrier frequencies (sub-carriers) within a channel bandwidth to transmit data. These sub-carriers, shown in FIG. 1A, are arranged for optimal bandwidth efficiency compared to more conventional transmission approaches, such as frequency division multiplexing, which waste large portions of channel bandwidth. OFDM, by contrast, allows sub-carriers to overlap significantly within the OFDM channel bandwidth. Despite this overlap, OFDM receiving systems recover information that has been modulated onto each sub-carrier.

FIG. 1B illustratively depicts an OFDM transmission system 10 in which an embodiment of the invention may find application. The OFDM transmission system 10 includes at least one data source 12, an encoding unit 16, a plurality of interleavers 18, an OFDM signal generation unit 20 and an antenna 22 in a wireless environment. There may be one or more data sources 12 providing a serial or parallel input bit stream 14 to the encoding unit 16. Each data source typically provides binary data in the form of bits for manipulation by the encoding unit 16 and subsequent transmission to a receiving system.

The encoding unit 16 receives the input bit stream 14 adds redundant data to the bit stream, and outputs a plurality of encoded bit streams. The redundant data is typically either error detecting codes, error correcting codes, extra data bits, or any combination thereof. Forward error correction (FEC) codes enable a limited number of errors to be detected and corrected without retransmission. FEC codes are typically applied to blocks of bits in the input bit stream 14. For example, referring to FIG. 1B, for each 10 bits in the input bit stream 14, the encoding unit 16 may produce five output bits, one bit per output data stream. The next encoded block may comprises eight bits from the previous block of 10 bits plus two new bits which are then encoded and output as a new five bits number of output bits and the number of inputs required to produce the output bits may be implemented in any convenient way, including with many more or fewer output bits.

Many different types of FEC encoding exist, are well known and are suitable for use in the encoding unit 16. Examples of FEC schemes include rate compatible punctured convolutional codes, Hamming codes, Hadamard codes, Golay codes, Sichlich codes, BCH codes, and Reed-Solomon codes, among others.

The encoding unit 16 may be implemented on a digital signal processor that is programmed to perform any of the encoding functions described in a well known manner. The encoding unit 16 outputs a plurality of bit streams as described. In FIG. 1B, for example, five bit streams are output, streams 0 through 4. Each stream from the encoder 16 is output to a corresponding interleaver 18.

Figures 1C, 1D:
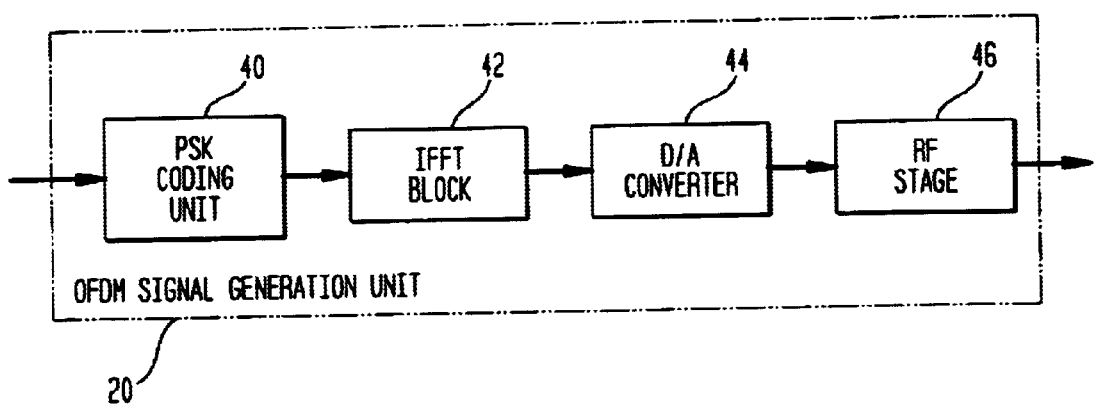
FIG. 1C depicts an internal view of an interleaver.
FIG. 1D depicts an internal view of the OFDM signal generation unit.

Each interleaver 18 receives a bit stream and reorders bits in the bit stream to separate adjacent bits. The interleaved stream is then output to the OFDM signal generation unit 20. An example of an internal view of the interleaver 18 is shown in FIG. 1C. The interleaver 18 includes a plurality of rows 30 and columns 32. The number of columns 32 is determined by the number of sub-carriers in each substream of the OFDM communications system. Assuming n sub-carriers in each substream, the number of columns is equal to n sub-carriers times the number of bits per symbol. The number of bits per symbol typically varies between 2 and 6 but is not confined to this range and depends upon the type phase shift keying (PSK) used in the OFDM system. For example, quadrature phase shift keying (Q-PSK) utilizes two bits for each symbol. The correlation between pairs of bits and each Q-PSK symbol will be explained below.

In a Q-PSK system, the number of columns 32 in the interleaver 18 is equal to n sub-carriers multiplied by 2 bits. The number of rows 30 may vary based upon the separation in adjacent bits that is desired. As shown in FIG. 1C, bits from the bit stream are fed into each interleaver beginning at the top of a first column and proceeding down the first column to the last position in that column and beginning again at the first position of the next column. The interleaver is filled in this manner until one or more rows have been filled. Subsequently, each filled row is output to the OFDM signal generation unit 20. The interleaver 18 may be implemented on the same digital signal processor (DSP) as the encoding unit 16.

The OFDM signal generation unit 20 receives as input the interleaved data streams from each of the five interleavers 18 shown in FIG. 1B. The OFDM signal generation unit outputs a composite signal that is transmitted via the antenna 22. An internal view of the OFDM signal generation unit is depicted in FIG. 1D. Referring to FIG. 1D, the OFDM signal generation unit 20 may include a PSK coding unit 40, an Inverse Fast Fourier transform (IFFT) block 42, an analog-to-digital (A/D) converter 44 and an RF stage 46. The PSK coding unit receives inputs from each of the five interleavers 18 shown. In the case of Q-PSK coding, each two bits is converted into a symbol Φ based on, for example, the table shown below.

TABLE 1

| BITS | SYMBOL |
|---|---|
| 00 | 0 |
| 01 | $\pi/2$ |
| 10 | $\pi$ |
| 11 | $3\pi/2$ |

The result of this coding is n symbols Φ where each symbol Φ is used to modulate one of n sub-carriers for each substream as shown in FIG. 1A. Each Φ represents a phase angle which imparts an amplitude and phase characteristic to each of the n sub-carriers. After processing n symbols for each stream, one complete OFDM frame as shown in FIG. 1A has been encoded in the frequency domain. The OFDM frame is then output to the inverse Fast Fourier transform (IFFT) block 42, either directly or by way of a pre-processor (not shown). The IFFT block 42 converts the OFDM frame from the frequency domain to the time domain. In particular, each modulated substream within the OFDM frame is converted to the time domain and summed together to produce a composite digital data in the time domain. The composite data is output to the digital-to-analog (D/A) converter 44. The D/A converter 44 converts the composite time domain signal to an analog signal and outputs it to the RF stage 46. The RF stage 46 upconverts the composite analog signal to a desired frequency 46 and transmits it via the antenna 22. The transmitted signal 22 may be received and processed by an OFDM receiver system.

FIG. 2 depicts an OFDM communications system with internal views of the transmission system 10 and the receiving system 50. The transmission system 10 includes the same components described in FIG. 1B. FIG. 2 also includes, however, delay blocks 17 interposed between the encoding unit 16 and each of the interleavers 18. Specifically, each of the substreams 0 through 4 output from the encoding unit 16 is delayed by a predetermined amount in each delay block 17. Substream 0 is not delayed at all. Substream 1 is delayed by amount d. Substream 2 is delayed by an amount 2d. Substream 3 and 4 are similarly delayed by 3d and 4d, respectively. The value d is typically a multiple of the time that it takes to stream n bits of data, where n is the number of sub-carriers, times the number of bits per symbol. The delay inserted into each substream is shown by a delay block 17. It is important to note, however, that there may not necessarily be a delay block as such. For example, when the encoding unit 16 and the interleavers 18 are implemented in a common digital signal processor, the data in each of the substreams 0 through 4 may be stored in a memory within a digital signal processor. Subsequently, data for substream 0 may be read out of the memory at a particular time, and the data for substream 1 may be read out d units of time later from the memory of the digital signal processor. Similarly, substreams 2, 3 and 4 may be read out at corresponding multiples of d delay units later for each of the corresponding interleavers. Digital Signal Processors, which typically include memory, registers, clock, control and arithmetic logic units, are well known and may be used for implementing digital functions of the transmission and receiving systems according to the present invention. Application specific integrated circuits may also be used to implement the present invention.

In still another approach for implementing delay, each of the interleavers 18 may be designed to store sequences of substream bits such that a delay is achieved in a similar manner. This may be done, for example, by designing each interleaver to have a substantial number of rows. For example, consider an interleaver with 25 rows. In the interleaver 18 for stream 0, bits may fill the interleaver beginning with row 1, column 1 and descend down each column until that column is full as was described earlier. The interleaver corresponding to stream 1, by contrast, may load the first bit into column 1, row 5. Subsequent consecutive bits may then be loaded into rows 6 through 20 of column 1 and 1 through 4 of column 1 prior to filling column 2 beginning at row 5. Similarly, data from substream 2 may begin filling the interleaver for substream 2 beginning at column 1, row 10. Similarly, data for substreams 3 and 4 may begin at rows 15 and 20 of column 1, respectively, of interleavers 18 corresponding to substreams 3 and 4. The implementation of delay has been illustratively explained above. However, it will be understood that the delay may be added anywhere along each of the substreams prior to transmission over the communications medium. For example, delay unit 17 may be implemented after each of the interleavers 18. When operating as a stand alone unit, each of the delay units 17 may be implemented as a shift register for receiving n times the number of bits per symbol in each shift register. To implement a delay of one OFDM frame, the shift register would contain n times the number of bits per symbol. To implement a delay of 2 OFDM frames, the shift register would include 2 times n times the number of bits per symbol. In this manner, any multiple of OFDM frames may be obtained for delay.

The provision of delay in the path in each substream is desirable for the following reasons. Without the delay unit 17, FEC encoded data is output from the FEC encoding unit 16 to each of the interleavers 18. The five bits, simultaneously output one on each substream, contain data and error correction bits for a single block of source data. As each of the five bits of source data proceeds in parallel to its respective interleaver, it is stored in the same row and column of the interleaver as the other four bits in the other four streams. Therefore, after the interleaving process, the five bits corresponding to the same source data block are included within the same OFDM frame for transmission over the communications medium. Therefore, despite interleaving, all of the FEC encoded data for each block of source data is present in a single transmitted OFDM frame. It is particularly undesirable, because flat fading, which takes out all of the frequencies within a given OFDM, frame will consequently wipe out all of the FEC encoded data for one or more blocks of source data. This situation may result in a loss of data requiring retransmission of data or a substantial degradation in signal quality.

When the delay block is inserted into each substream by contrast, the FEC data corresponding to each block of source data is distributed among several different OFDM frames that are transmitted at separate time intervals. Ideally, the FEC data corresponding to each source block is spread such that several OFDM frames intervene between each FEC encoded bit for a given source block. This makes the OFDM communications system much more robust against flat fading on the communications medium. This is because flat fading typically exists only for a finite time interval. By spreading FEC data over time, it is less likely that FEC data, corresponding to a whole block of source data will be lost as a result of flat fading intervals on the channel.

After delay is inserted into each substream, the interleave substreams are output to the OFDM signal generation unit 20 which in turn processes the interleaved data stream as previously described and transmits an RF signal via the antenna 22 with the composite signal.

The receiving system 50 receives the composite signal from the communications medium via the antenna 52. The receiving system further includes an OFDM demodulation and demultiplexing block 54, a plurality of delay blocks 56, a plurality of de-interleavers 58 and a decoding unit 60. Blocks 52 through 60 of the receiving system perform the reverse process from that depicted and described with respect to blocks 16 through 22 of the transmission system.

Figure 2B:
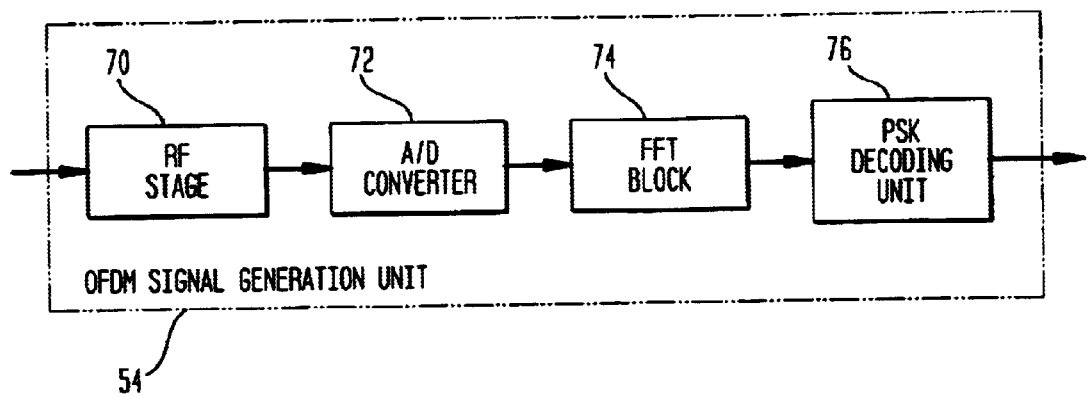
FIG. 2B depicts an internals view of the OFDM de-modulating and de-multiplexing unit of the OFDM receiving system.

The OFDM demodulation and demultiplexing unit 54 is shown in an internal view in FIG. 2B. It includes an RF stage 70 coupled to the antenna 52 for receiving the composite signal and downconverting it to restore the sub-carriers to their proper respective frequencies. The RF stage 70 then outputs the sub-carriers within each OFDM frame to the A/D converter 72. The A/D converter 72 converts the composite analog signal into a composite digital signal for output to the Fast Fourier Transform (FFT) block 74 either directly or via a preprocessor (not shown). The FFT block 74 converts the composite digital time domain signal into the frequency domain for further processing. The OFDM frame is then output to the (PSK) decoding unit 76. The decoding unit 76 converts each phase of a respective one of the n sub-carriers in each substream of the OFDM frame to bits occupying a particular position in an output bit stream. The decoding unit 76 outputs five substreams of bits that are interleaved.

The interleaved substreams 0 through 4 are then delayed by predetermined amounts by delay blocks 56 prior to entering the de-interleavers 58. The amount of delay applied to each substream in the receiver system 50 is determined based on the amount of delay applied to each substream in the transmission system 10. For example, consider two pairs of bits output from the encoding unit 16 of the transmission system 10. The first pair of bits is output from the encoding unit 16 on substream 0, encounters no delay is interleaved and transmitted to the receiver system 50. The fifth pair of bits is output from the encoding unit 16 of the transmission system 10 on substream 4. The fifth pair of bits encounters a delay 4d, prior to being interleaved and transmitted via the antenna 22 to the receiver system 50.

At the receiver, the first pair of bits is demodulated and demultiplexed and encounters a delay of 4d prior to being deinterleaved on substream 0 of the receiver system 50. The fifth pair of bits is demodulated and demultiplexed and encounters no delay prior to being deinterleaved on substream 4. As each of the first pair of bits and the fifth pair of bits arrives at the decoder 60 of the receiver system 50, each of the pair of bits has encountered the same total delay 4d. Therefore, the first and fifth pair of bits arrives simultaneously at the decoder unit 60. The delay applied to each substream in the receiver system 50 should therefore be made such that the total delay on each substream is the same.

The deinterleaver units 58 operate in the reverse manner as that described with respect to the interleaver units 18 in the transmission system 10. The decoding unit 60 receives the five substreams of data and reconstructs from the five substreams data corresponding to the source data 12. The decoding unit 60 typically uses a well known Viterbi decoding algorithm, but is not confined to this method, to recover the data 64. Due to noise on the communications medium, bits of data in the substreams entering the decoding unit 60 may be corrupted. The Viterbi decoding algorithm, therefore, examines all of the bits received, including redundant bits, error detecting and FEC bits. Based on these bits, the Viterbi decoding algorithm corrects missing bits based on the redundant bits and FEC bits and asembles the substreams into one or more streams of data corresponding to the data source 12.

While specific embodiments of the invention have been shown and described, it will be understood by those having ordinary skill in the art that changes may be made to those embodiments without departing from the spirit and scope of the invention. For example, while embodiments of the invention have been described with reference to an OFDM system including a plurality of interleavers, it will be understood that the present invention may be implemented using other transmission schemes including FDM and spread spectrum, CDMA and numerous others. Moreover, the while interleavers and de-interleavers have been illustrated as part of the transmission and receiving systems, it will be understood that the invention may be applied to communications systems which do not include interleavers and de-interleavers.

What is claimed is:

1. A transmission system for increasing the effectiveness of forward error correction (FEC), comprising:
   an encoder encoding blocks of source data by deriving error correction codes based on the blocks of source data and outputting a plurality of substreams of data including the error correction codes;
   a plurality of interleavers for reordering each substream;
   at least one delay unit for delaying at least one of the plurality of substreams relative to the other substreams; and
   a signal generation unit for modulating a plurality of subcarriers based on the interleaved substreams and upconverting the modulated subcarriers for transmission,
   wherein the plurality of subcarriers form one orthogonal frequency division multiplexed (OFDM) frame,
   wherein a separate OFDM frame includes each of the error correction codes, and
   wherein the error correction codes do not appear in consecutive OFDM frames.

2. The transmission system according to claim 1, wherein the at least one delay unit inserts a delay that is an integer multiple of the OFDM frame period.

3. The transmission system according to claim 1, wherein the delay unit is a shift register.

4. The transmission system according to claim 1, further comprising a memory for storing the plurality of substreams including the error correction codes.

5. The transmission system according to claim 4, wherein the at least one delay unit delays the at least one of the plurality of substreams relative to the other substreams by delaying reading from the memory the at least one of the plurality of substreams.

6. The transmission system according to claim 1, wherein the at least one delay unit, the encoder and the interleavers are implemented on a digital signal processor.

7. The transmission system according to claim 1, wherein the at least one delay unit, the encoder and the interleavers are implemented on an application specific integrated circuit.

8. The transmission system according to claim 1, wherein the at least one delay unit is part of at least one of the plurality of interleavers.

9. A receiving system for receiving and recovering transmitted data, comprising:
   a receiver for down converting, demodulating and demultiplexing a received signal having a plurality of subcarriers into a plurality of interleaved substreams;
   at least one delay unit delaying at least one of the plurality of substreams relative to the other substreams to equalize a total delay for each substream;
   a plurality of de-interleavers for reordering each substream; and
   a decoder, receiving the reordered substreams, correcting errors present in the reordered substreams based on error correction data in the substreams and outputting decoded data,
   wherein the plurality of subcarriers form one orthogonal frequency division multiplexed (OFDM) frame,
   wherein a separate OFDM frame includes each of the error correction codes, and
   wherein the error correction codes do not appear in consecutive OFDM frames.

10. The receiving system according to claim 9, wherein the at least one delay unit inserts a delay that is an integer multiple of the OFDM frame period.

11. The receiving system according to claim 9, wherein each of the delay units is a shift register.

12. The receiving system according to claim 9, further comprising a memory for storing the plurality of substreams including the error correction codes.

13. The receiving system according to claim 12, wherein the at least one delay unit adds delay by delaying reading from the memory the at least one of the plurality of substreams.

14. The receiving system according to claim 9, wherein the at least one delay unit, the encoder and the interleavers are implemented on a digital signal processor.

15. The receiving system according to claim 9, wherein the at least one delay unit, the encoder and the interleavers are implemented on an application specific integrated circuit.

16. The receiving system according to claim 9, wherein the at least one delay unit is part of at least one of the plurality of interleavers.

17. A communications system for increasing the effectiveness of forward error correction (FEC), including:

a transmission system comprising
- an encoder encoding blocks of source data by deriving error correction codes based on the blocks of source data and outputting a plurality of transmission substreams of data including the error correction codes;
- a plurality of interleavers for reordering each transmission substream;
- at least one delay unit for delaying at least one of the plurality of transmission substreams relative to the other transmission substreams; and
- a signal generation unit for modulating a plurality of subcarriers based on the interleaved transmission substreams and upconverting the modulated subcarriers for transmission,
- wherein the plurality of subcarriers form one orthogonal frequency division multiplexed (OFDM) frame,
- wherein a separate OFDM frame includes each of the error correction codes, and
- wherein the error correction codes do not appear in consecutive OFDM frames; and a receiving system comprising
- a receiver for down converting, demodulating and demultiplexing the upconverted, modulated subcarriers into a plurality of interleaved, received substreams, each received substream corresponding to one of the transmission substreams;
- at least one delay unit delaying at least one of the plurality of received substreams relative to the other received substreams to equalize a total delay among the received substreams and their corresponding transmission substreams;
- a plurality of de-interleavers for reordering each received substream; and
- a decoder, receiving the reordered received substreams, correcting errors present in the reordered, received substreams based on error correction data in the received substreams and outputting decoded data.

18. The communication system according to claim 17, wherein the at least one delay unit inserts a delay that is an integer multiple of the OFDM frame period.

19. A method for increasing the effectiveness of forward error correction (FEC) in a transmission system, comprising:
- encoding blocks of source data by deriving error correction codes based on the blocks of source data;
- outputting a plurality of substreams of data including the error correction codes;
- delaying at least one of the plurality of substreams relative to the other substreams; and
- modulating a plurality of subcarriers based on the substreams,
- wherein the plurality of subcarriers form one orthogonal frequency division multiplexed (OFDM) frame,
- wherein a separate OFDM frame includes each of the error correction codes, and
- wherein the error correction codes do not appear in consecutive OFDM frames.

20. The method according to claim 19, further comprising the step of interleaving the plurality of substreams prior to the upconverting step.

21. The transmission system according to claim 19, wherein the at least one delay unit inserts a delay that is an integer multiple of the OFDM frame period.

22. A method for receiving and recovering transmitted substreams of data including error correcting codes, comprising:
- down converting a received signal having a plurality of subcarriers;
- demodulating the plurality of subcarriers into a plurality of substreams, each substream including error correction data;
- delaying at least one of the plurality of substreams relative to the other substreams to equalize a total delay among all of the substreams;
- decoding the substreams to correct errors present in the substreams based on the error correction data in the substreams; and
- outputting the corrected substreams,
- wherein the plurality of subcarriers form one orthogonal frequency division multiplexed (OFDM) frame,
- wherein a separate OFDM frame includes each of the error correction codes, and
- wherein the error correction codes do not appear in consecutive OFDM frames.

23. The method according to claim 22, further comprising the step of de-interleaving the plurality of substreams prior to the decoding step.

24. The method according to claim 22, wherein the at least one delay unit inserts a delay that is an integer multiple of the OFDM frame period.

* * * * *